(12) United States Patent
Khare et al.

(10) Patent No.: US 6,810,467 B1
(45) Date of Patent: Oct. 26, 2004

(54) METHOD AND APPARATUS FOR CENTRALIZED SNOOP FILTERING

(75) Inventors: Manoj Khare, Saratoga, CA (US);
Faye A. Briggs, Portland, OR (US);
Kai Cheng, Portland, OR (US); Lily Pao Looi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 09/643,382

(22) Filed: Aug. 21, 2000

(51) Int. Cl.$^7$ .............................................. G06F 12/08
(52) U.S. Cl. ..................... 711/146; 711/144; 711/145; 711/140
(58) Field of Search ............................... 711/146, 141, 711/144, 145, 140

(56) References Cited

U.S. PATENT DOCUMENTS

| | | | |
|---|---|---|---|
| 6,088,769 A | 7/2000 | Luick et al. | 711/141 |
| 6,338,122 B1 * | 1/2002 | Baumgartner et al. | 711/141 |
| 6,374,331 B1 | 4/2002 | Janakiraman et al. | 711/141 |

FOREIGN PATENT DOCUMENTS

| | | |
|---|---|---|
| EP | 0 817 074 A1 | 1/1998 |
| WO | WO 01/29674 A1 | 4/2001 |

OTHER PUBLICATIONS

PCT Written Opinion VII Certain defects in the international application. pp. 1–9. Application No. PCT/US01/25061.
Scott et al., *Performance of Pruning–Cache Directories for Large–Scale Multiprocessors*, IEEE Transactions on Parallel and Distributed Systems, IEEE, Inc., New York, US, vol. 4, No. 5, May 1, 1993, pp. 520–534, ISSN: 1045–9219.
PCT International Search Report for PCT/US01/25061, mailed Sep. 23, 2002.

* cited by examiner

*Primary Examiner*—Reginald G. Bragdon
(74) *Attorney, Agent, or Firm*—Blakely, Sokoloff, Taylor & Zafman LLP

(57) ABSTRACT

An example embodiment of a computer system utilizing a central snoop filter includes several nodes coupled together via a switching device. Each of the nodes may include several processors and caches as well as a block of system memory. All traffic from one node to another takes place through the switching device. The switching device includes a snoop filter that tracks cache line coherency information for all caches in the computer system. The snoop filter has enough entries to track the tags and state information for all entries in all caches in all of the system's nodes. In addition to the tag and state information, the snoop filter stores information indicating which of the nodes has a copy of each cache line. The snoop filter serves in part to keep snoop transactions from being performed at nodes that do not contain a copy of the subject cache line, thereby reducing system overhead, reducing traffic across the system interconnect busses, and reducing the amount of time required to perform snoop transactions.

16 Claims, 4 Drawing Sheets

METHOD AND APPARATUS FOR CENTRALIZED SNOOP FILTERING

FIELD OF THE INVENTION

The present invention pertains to the field of computer systems. More particularly, this invention pertains to the field of performing snoop operations in a multinode computer system.

BACKGROUND OF THE INVENTION

Cache coherency is a critical element of any computer system. In network server computer systems, maintaining cache coherency is a difficult task due to the fact that a typical network server includes multiple processors working out of multiple caches. Some computer systems are based on a nodal architecture where several processors, their cache memories, and a block of system memory constitute a node. The computer system may include multiple nodes.

In a typical prior system, in order to maintain cache coherency, snoop filters are included in each node. This architecture may be referred to as a distributed snoop architecture. The snoop filters for each node track cache coherency protocol state information for all cache lines currently cached in any of that node's processor caches. A popular cache coherency protocol is the MESI (modified, exclusive, shared, or invalid) protocol.

In a distributed snoop architecture, when one node wishes to read a line of data from a memory location, it first must ascertain whether any cache in the system has a copy of that line of data. It is possible for several copies of the line of data to exist in caches from several nodes and the copies may be cached in any of the states allowed in the MESI protocol. In order to determine which node has a copy of the line of data and in what states the line has been cached, the node wishing to read the line of data must query the all of other nodes. Thus, all nodes must be queried even though some of the nodes may have not cached the line data in question. This results in a waste of bus bandwidth and creates undesirable system overhead and increased latency.

Another prior system for maintaining cache coherency involves the use of snoop directories. In this architecture, each node with system memory includes a snoop directory. The snoop directories track information for all cache activities involving memory locations located at that node. Each snoop directory tracks which nodes have cached lines of data from the snoop directory node's system memory and also tracks in which states those lines have been cached. Thus, with this distributed directory architecture, when a node (the "requesting" node) wishes to read from a memory location located at another node (the "home" node), the requesting node must contact the home node who consults its directory. The home node then issues snoop requests to any nodes that have cached copies of the memory lines in question. The various nodes then respond back to the home node and the home node can then provide the requested data to the requesting node. The steps of first contacting the home node and then the home node contacting the other nodes for snoop information can result in undesirable system overhead, particularly in computer systems whose nodes are coupled together via a switching device.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

An example embodiment of a computer system utilizing a central snoop filter includes several nodes coupled together via a switching device. Each of the nodes may include several processors and caches as well as system memory. All traffic from one node to another takes place through the switching device. The switching device includes a snoop filter that tracks cache line coherency information for all caches in the computer system. The snoop filter has at least enough entries to track the tag addresses and state information for all entries in all caches in all of the system's nodes. In addition to the tag and state information, the snoop filter stores information indicating which of the nodes has a copy of each cache line. The snoop filter serves in part to keep snoop transactions from being performed at nodes that do not contain a copy of the subject cache line, thereby reducing system overhead, reducing traffic across the system interconnect busses, and reducing the amount of time required to perform snoop operations.

One embodiment of the central snoop filter utilizes a variant of the MESI protocol. The snoop filter in this embodiment tracks whether a cache line is invalid, shared, or modified/exclusive. The full MESI protocol is supported at the caches located at the various nodes. Other protocols may be used so long as transactions at all of the caching agents are consistent.

Because the central snoop filter is inclusive of all caches at all of the caching agents, a caching agent should not have a copy of a cache line that is not present in the snoop filter. If a line is evicted from the snoop filter it must be evicted from the caching agents of all the nodes that contain a copy of the line.

The snoop filter tracks which nodes have a copy of a line by using a presence vector. The presence vector is a field of bits where each bit in the field corresponds to a particular node.

Instead of a vector field, alternative embodiments are possible using different snoop filters for each node. The snoop filters are located in the switching devices and are therefore centrally located. The snoop filter or snoop filters may be implemented such that certain snoop filter entries apply to one node, other entries apply to another node, and so on.

Figure 1:
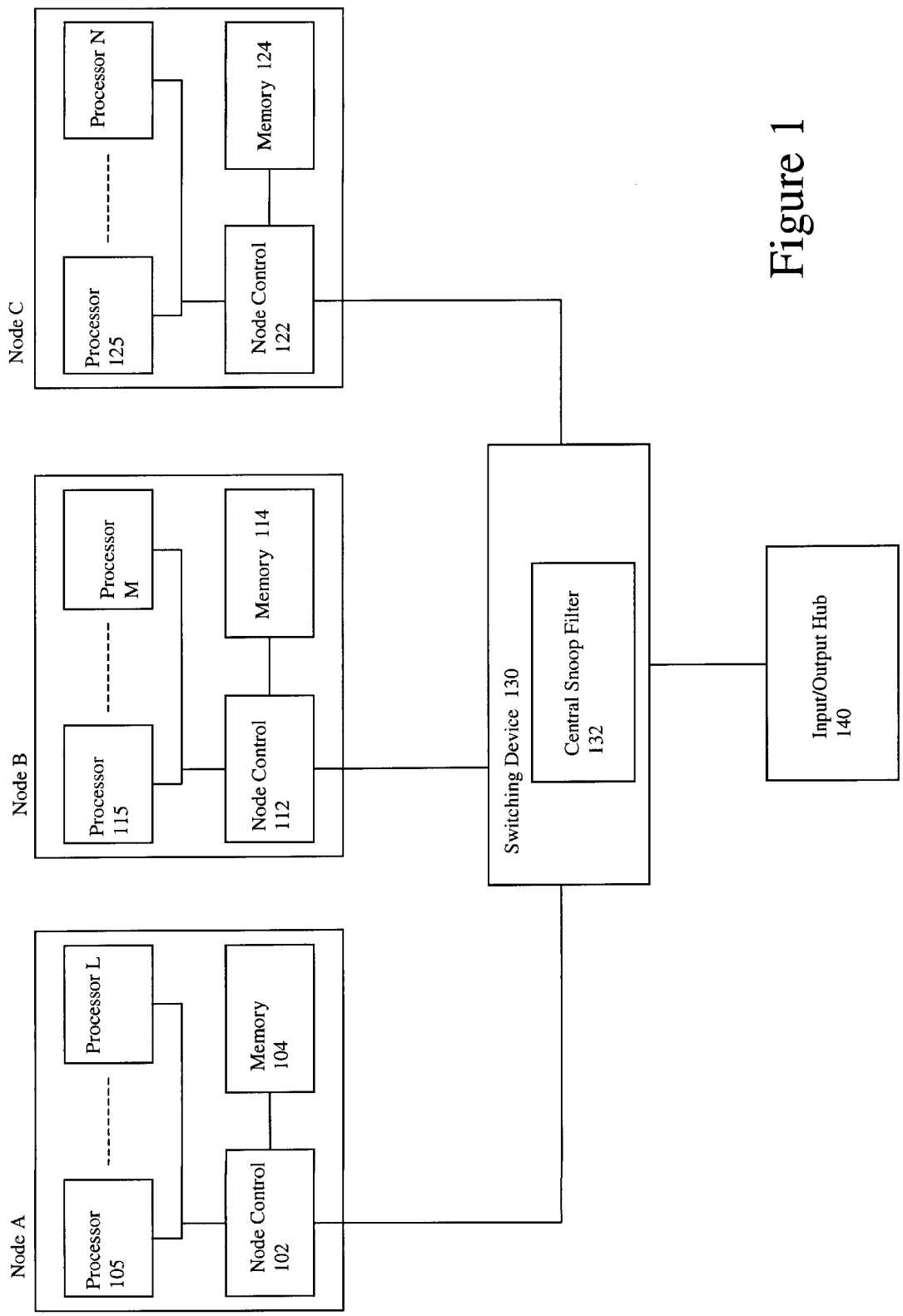
FIG. 1 is a block diagram of one embodiment of a system including several nodes coupled by a switching device where the switching device includes a central snoop filter.

FIG. 1 is a block diagram of a system including node A, node B, and node C. Node A may include multiple processors labeled 105 through L. Node B may include multiple processors labeled 115 through M. Node C may include multiple processors labels 125 through N. Node A also includes a node control circuit 102 and a block of system memory 104. Node B also includes a node control circuit 112 and a block of system memory 114. Node C further includes a node control circuit 122 and a block of system memory 124. The processors of nodes A, B, and C include caches.

Nodes A, B, and C are each coupled to a switching device 130. The switching device 130 includes a central snoop filter 132. An input/output hub 140 is also coupled to the switching device 130. The input/output hub 140 may also include a cache. The snoop filter 132 includes enough entries to track the tags, state, and presence information for all entries in all caches in all of the system's nodes, including the processor caches and the input/output hub 140 cache.

An example of a data read transaction to a line of memory that is not cached in any of the system's caches will now be discussed. For this example, node A is the requesting node (the node issuing the read transaction) and node C is the home node (the node that includes the portion of system memory addressed by the read request). Node A issues a read request to the switching device 130. The snoop filter 132 then performs a lookup operation to determine if the line of memory addressed by the read request has been cached at any of the nodes A, B, or C or at the input/output hub 140. While the snoop filter 132 is performing the lookup operation, the switching device 130 issues a speculative memory read to node C. The switching device 130 includes memory decode circuitry that allows it to determine which node is being addressed by the read request. For this example, the snoop filter lookup indicates that the line of memory addressed by the read request is not cached in any of the system's caches. The switching device 130 delivers a snoop response to node A and also sends a memory read confirmation to node C. In response to the memory read confirmation, node C delivers the requested data to the switching device 130. The switching device 130 then delivers the requested data to node A. Because node A is the only node that has cached the subject cache line, the snoop filter 132 marks its entry for this cache line as "exclusive" and the presence vector is set to indicate that node A has a copy of the cache line.

An example of a memory write transaction to a cache line shared between two nodes will now be discussed. For this example, node A is the requesting node and is also the home node. In other words, node A is writing a line of data to its own memory. Node A begins by issuing an invalidate cycle to the switching device 130. The snoop filter 132 then performs a lookup operation to determine which nodes have copies of the cache line and also to determine in which state the line is cached. The lookup operation in this example indicates that the cache line is "shared" and that nodes B and C have copies. The switching device 130 then issues invalidate cycles to nodes B and C. Nodes B and C respond with snoop response signals and then the switching device 130 delivers a snoop response to node A to complete the transaction. The snoop filter 132 now shows that node A has the only copy of the cache line and that the line is in the "exclusive/modified" state.

An example of a read cycle to a "modified" cache line will now be discussed. For this example, node A is the request node, node B is the node that has modified its copy of the cache line in question, and node C is the home node (the node whose block of system memory includes the memory location corresponding to the cache line). Node A begins the transaction by issuing a read request to the switching device 130. The snoop filter 132 performs a lookup operation while the switching device 130 issues a speculative memory read to node C. The result of the snoop filter lookup indicates that node B has a modified copy of the cache line. The switching device 130 sends a snoop request to node B and node B responds with a snoop response along with the modified data. The switching device 130 then delivers the snoop response and the data to node A and at the same time delivers the data to node C so that the system memory can be updated. Node C then signals a completion to the switching device 130 and the completion is forwarded from the switching device 130 to node A to complete the transaction.

It is possible to use multiple snoop filters in a system in order to provide sufficient snoop filter throughput and capacity to meet system scalability requirements. In such cases, different snoop filters keep track of mutually exclusive set of cache lines. A cache line is tracked at all times by only one snoop filter.

Figure 2:
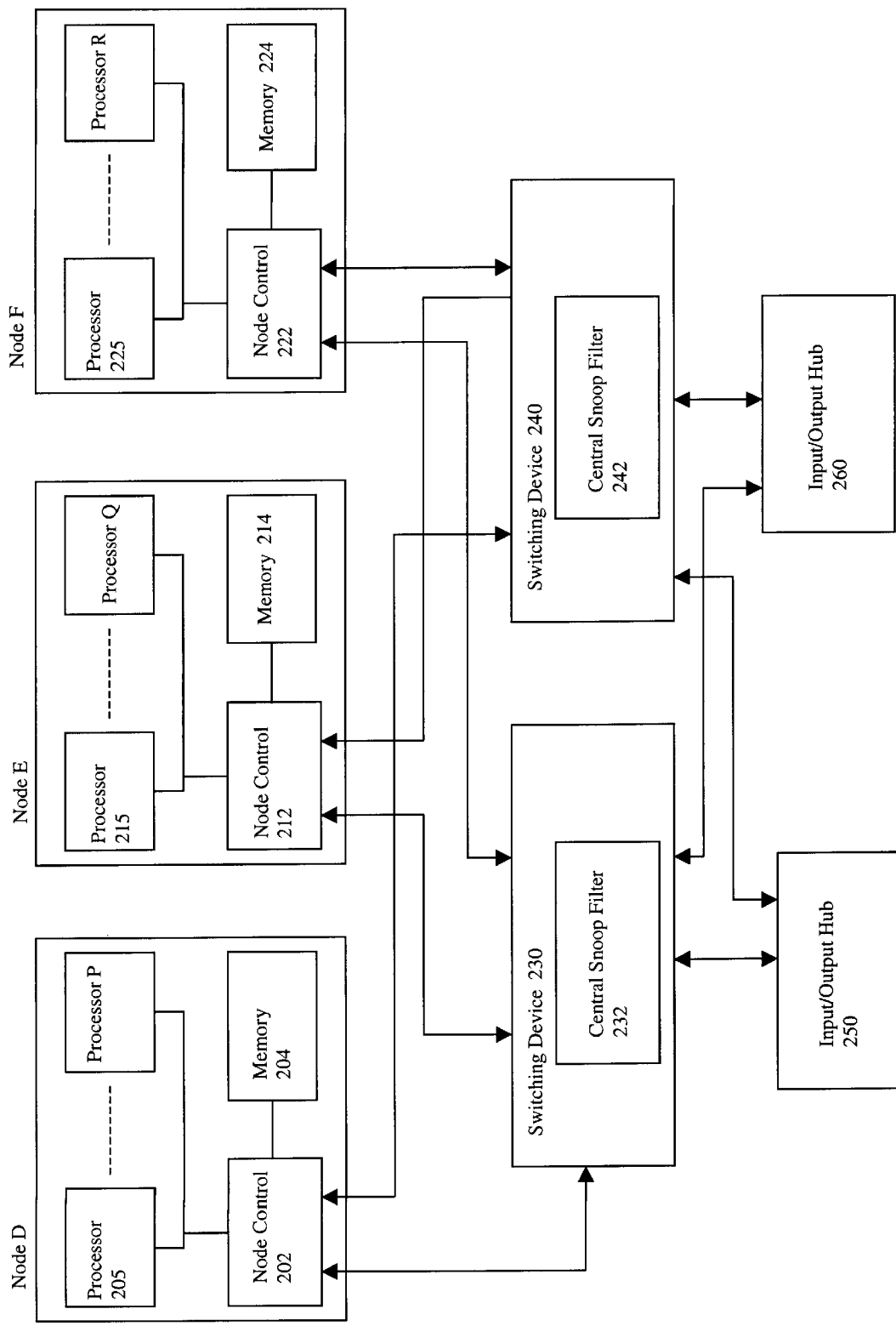
FIG. 2 is a block diagram of one embodiment of a system including several nodes coupled by two switching devices where each of the switching devices include a central snoop filter.

FIG. 2 is a block diagram of a system including node D, node E, and node F and also including two snoop filters 232 and 242. Node D may include multiple processors labeled 205 through P. Node E may include multiple processors labeled 215 through Q. Node F may include multiple processors labels 225 through R. Node D also includes a node control circuit 202 and a block of system memory 204. Node E also includes a node control circuit 212 and a block of system memory 214. Node F further includes a node control circuit 222 and a block of system memory 224. The processors of nodes D, E, and F include caches.

Nodes D, E, and F are each coupled to switching device 230 and also to switching device 240. The switching device 230 includes the central snoop filter 232. An input/output hub 250 is also coupled to the switching device 230 as well as switching device 240. The input/output hub 250 may also include a cache. The switching device 240 includes the central snoop filter 242. An input/output hub 260 is also coupled to the switching device 240 and also to switching device 230. The input/output hub 260 may also include a cache.

The snoop filter 232 includes enough entries to track the tags, state, and presence information for half of all entries in all caches in all of the system's nodes, including the processor caches and the input/output hub caches. The snoop filter 242 contains entries for the remainder of the system cache entries. In one embodiment, the nodes D, E, and F interleave their accesses to the switching devices 230 and 240 on an alternating cache line basis.

Figure 3:
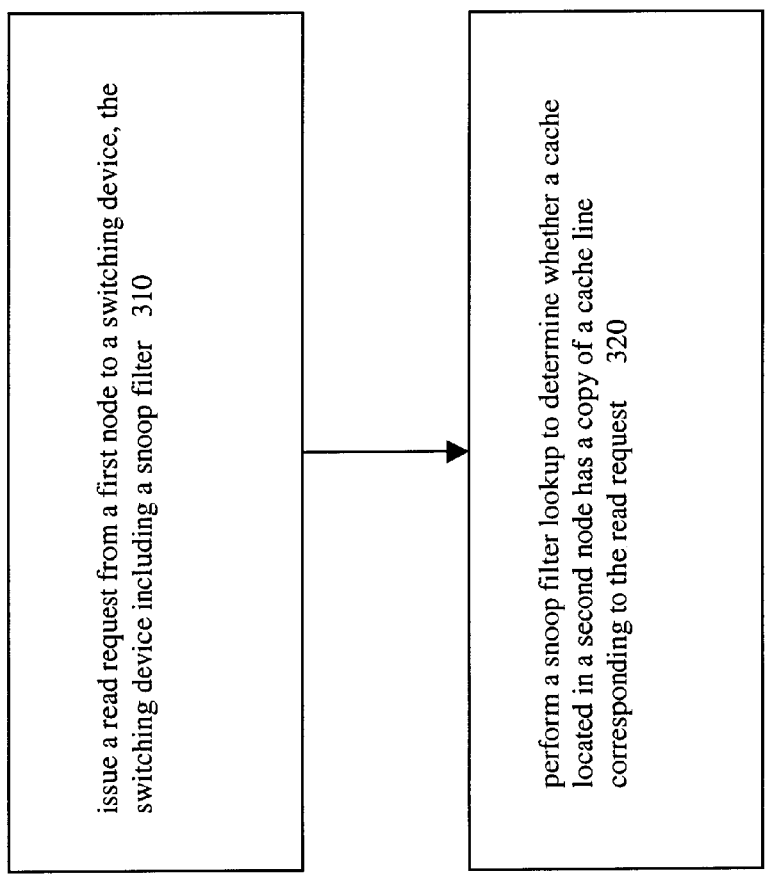
FIG. 3 is a flow diagram of one embodiment of a method for performing a snoop cycle using a central snoop filter located in a switching device.

FIG. 3 is a flow diagram of one embodiment of a method for performing a snoop cycle using a central snoop filter located in a switching device. At block 310 a read request is issued from a first node to a switching device. The switching device includes a snoop filter. At block 320 a snoop filter lookup is performed to determine whether a cache located in a second node has a copy of a cache line corresponding to the read request.

Figure 4:
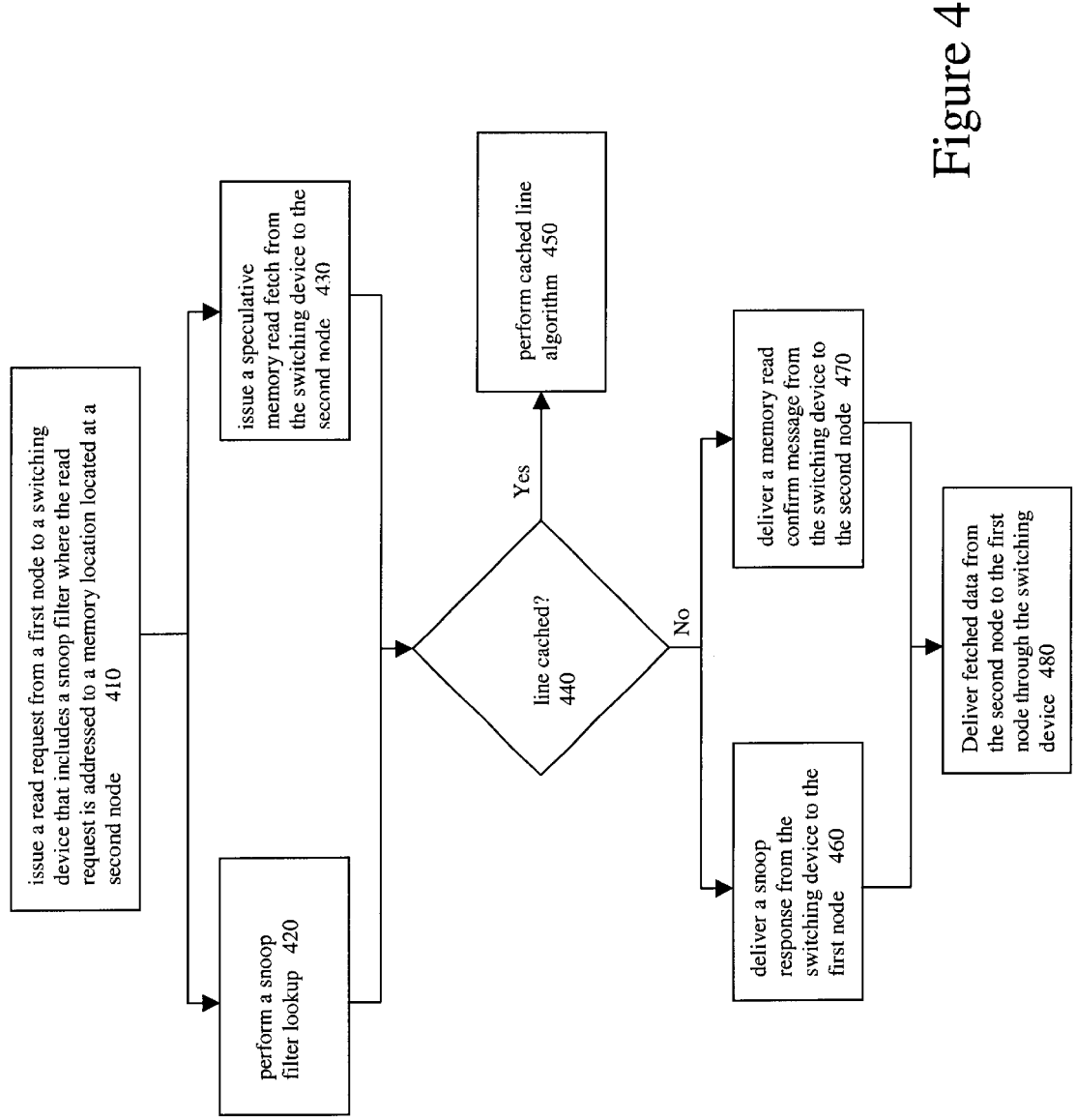
FIG. 4 is a flow diagram of one embodiment of a method for performing a read transaction including a snoop cycle using a central snoop filter located in a switching device.

FIG. 4 is a flow diagram of one embodiment of a method for performing a read transaction including a snoop cycle using a central snoop filter located in a switching device. At block 410, a read request is issued from a first node to a switching device that includes a snoop filter. The read request is addressed to a memory location located at a second node. At block 420 a snoop filter lookup is performed while at the same time at block 430 a speculative memory read fetch is issued from the switching device to the second node. Block 440 indicates that if the snoop filter lookup determines that the line of memory specified by the read request is cached at one or more of the nodes, then a cached line algorithm is preferred at block 450. Examples of this type of algorithm are discussed above in connection with FIG. 1. Block 440 also indicates that if the snoop filter lookup determines that the line of memory specified by the read request is not cached by any of the caching agents then at block 460 a snoop response is delivered from the switching device to the first node. At the same time, at block 470 a memory read confirm message is delivered from the switching device to the second node. Finally, at block 480 the fetched data is delivered from the second node to the first node through the switching device.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
    a plurality of node interface ports to provide communication with a plurality of nodes;
    a snoop filter to maintain cache coherency information for the plurality of nodes, and
    a read prefetch unit to perform a speculative read operation to a second one of the plurality of nodes while a lookup is simultaneously performed in the snoop filter, lookup results delivered to a first one of the plurality of nodes while simultaneously, if the lookup indicates that no node has a cached line of memory corresponding to an address specified by the read operation, a memory read confirm message is delivered to the second one of the plurality of nodes.

2. The apparatus of claim 1, wherein each of the plurality of nodes includes a cache and further wherein the snoop filter includes at least as many entries as the amount of entries included in all of the caches located in the plurality of nodes.

3. The apparatus of claim 2 wherein each snoop filter entry includes an address tag.

4. The apparatus of claim 3 wherein each snoop filter entry includes a field indicating a cache coherency protocol state for a corresponding cache line.

5. The apparatus of claim 4 wherein each snoop filter entry includes a field indicating which of the plurality of nodes has a copy of a corresponding cache line in its cache.

6. The apparatus of claim 5, one of the plurality of node interface ports to receive a snoop request from one of the plurality of nodes and the snoop filter to determine which of the other of the plurality of nodes has a copy of a cache line corresponding to the snoop request and to determine which cache coherency protocol state is indicated for the cache line.

7. A system, comprising:
    a switching device including a snoop filter;
    a first node coupled to the switching device; and
    a second node coupled to the switching device, the switching device including a read prefetch unit to perform a speculative read operation to the second node while a lookup is simultaneously performed in the snoop filter, lookup results delivered to the first node while simultaneously, if the lookup indicates that no node has a cached line of memory corresponding to an address specified by the read operation, a memory read confirm message is delivered to the second node.

8. The system of claim 7 wherein the first node includes a processor and a cache.

9. The system of claim 8 wherein the second node includes a processor, a memory device, and a cache.

10. The system of claim 9 wherein the snoop filter includes at least as many entries as the amount of entries included in the first and second node caches.

11. The system of claim 10 wherein each snoop filter entry includes an address tag.

12. The system of claim 11 wherein each snoop filter entry includes a field indicating a cache coherency protocol state for a corresponding cache line.

13. The system of claim 12 wherein each snoop filter entry includes a field indicating which of the first and second nodes has a copy of a corresponding cache line in its cache.

14. The system of claim 13, the switching device to receive a snoop request from the first node and the snoop filter to determine which of the first and second nodes has a copy of a cache line corresponding to the snoop request and to determine which cache coherency protocol state is indicated for the cache line.

15. A method, comprising:
    issuing a read request from a first node to a switching device, the switching device including a snoop filter, the first node one of a plurality of nodes, the read request addressed to a memory location located at a second node, the second node also one of the plurality of nodes, each of the plurality of nodes including a cache;
    performing a snoop filter lookup while issuing a speculative memory read fetch from the switching device to the second node;
    delivering a snoop response from the switching device to the first node while simultaneously, if the snoop filter lookup indicates that no node has a cached line of memory corresponding to the memory address specified by the read request, a memory read confirm message is delivered to the second node;
    delivering data in response to the memory read confirm message from the second node to the switching device; and
    delivering the data from the switching device to the first node.

16. The method of claim 15 further comprising indicating within the snoop filter that the delivered data has been cached by the first node in an exclusive state.

* * * * *